(12) United States Patent
Gohde

(10) Patent No.: US 7,584,765 B2
(45) Date of Patent: Sep. 8, 2009

(54) METER BAR

(75) Inventor: Jon Gohde, Dubuque, IA (US)

(73) Assignee: A. Y. McDonald Mfg. Co., Dubuque, IA (US)

( * ) Notice: Subject to any disclaimer, the term of this patent is extended or adjusted under 35 U.S.C. 154(b) by 651 days.

(21) Appl. No.: 10/963,204

(22) Filed: Oct. 11, 2004

(65) Prior Publication Data

US 2006/0076059 A1    Apr. 13, 2006

(51) Int. Cl.
    *F16K 43/00*    (2006.01)
(52) U.S. Cl. .................. 137/315.06; 73/201; 285/30
(58) Field of Classification Search ........... 137/315.06, 137/605, 606; 73/201; 285/30
    See application file for complete search history.

(56) References Cited

U.S. PATENT DOCUMENTS 2,579,656  A  * 12/1951  Douglas el al. ............... 73/201
3,815,859  A  *  6/1974  Leopold et al. ............... 285/61
5,315,869  A  *  5/1994  Bier et al. ..................... 285/30
5,918,624  A  *  7/1999  Young .................... 137/315.06
6,283,153  B1 *  9/2001  Brisco et al. ................. 73/201

* cited by examiner

*Primary Examiner*—Kevin L Lee
(74) *Attorney, Agent, or Firm*—Wood, Phillips, Katz, Clark & Mortimer

(57) ABSTRACT

Potential leakage points are avoided, mishandling or loss of loose, unattached parts minimized and installation in tight places facilitated by a meter bar of elongated cast metal structure having a central bar, an outlet conduit section and an inlet conduit section, both integral with the meter bar. The inlet and outlet sections may include integral tail pieces and an upstream end of the inlet section includes an elongated, downwardly curved conduit to eliminate the need for the use of elbows, pipes or nipples, etc.

14 Claims, 3 Drawing Sheets

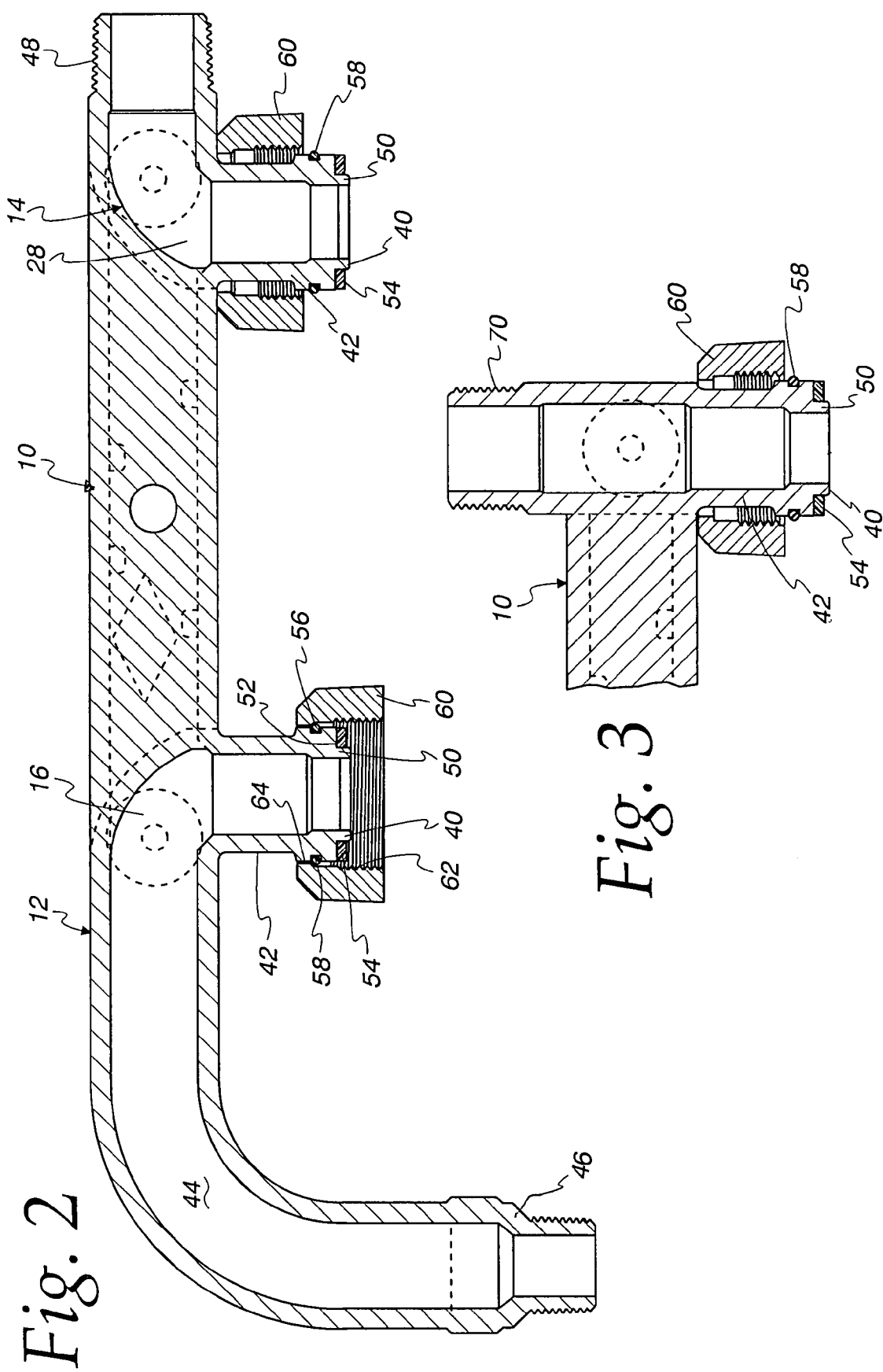

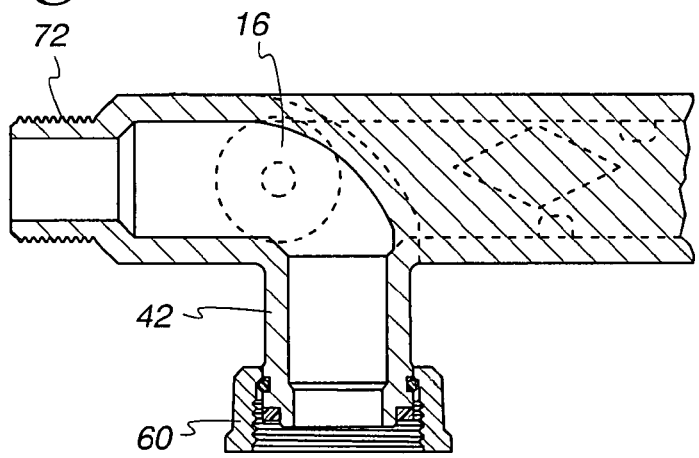
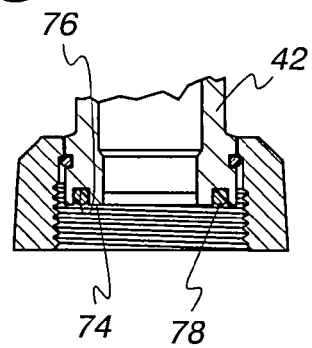
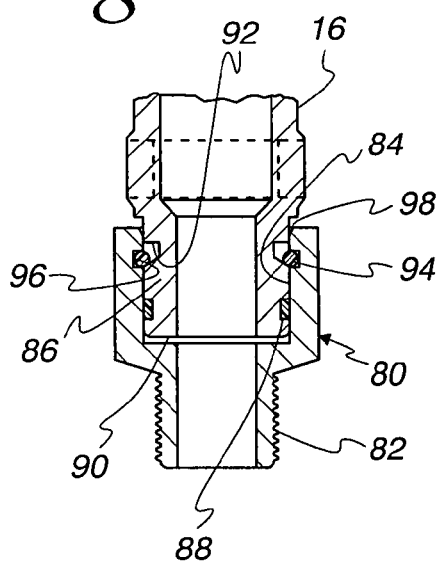
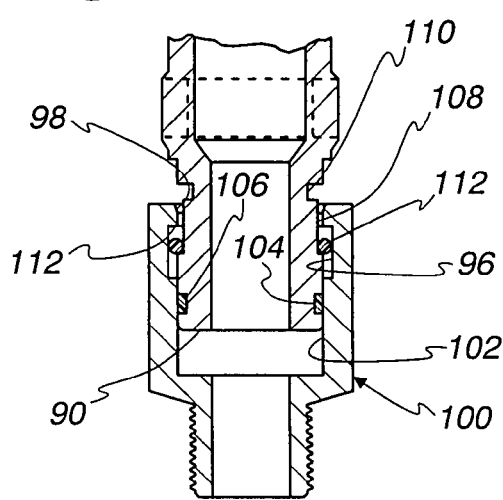

METER BAR

FIELD OF THE INVENTION

This invention relates to a meter bar, and more particularly, to a meter bar assembly that is adapted to be connected into a fluid handling system, such as a gas distribution system, for mounting a fluid flow measuring meter in the system.

BACKGROUND OF THE INVENTION

Meter bars are common in various types of fluid distribution systems, most notably, natural gas and other manufactured gas distribution systems. In the usual case, the bar is disposed generally horizontally and supports a meter which meters the flow of the fluid through the system. In the usual case, the meter bar will have an inlet end and an outlet end and both have conduits internal to the bar itself. At the inlet end, one port for the conduit will be connected to the fluid supply and the other connected to the inlet side of the meter. At the outlet end of the bar, the outlet of the meter will be connected to one of the ports and the other port at the outlet end will be connected to the system that distributes the fluid to a point of use, typically within a structure or the like.

While conventional meter bars work well for their intended purpose, they are not without their points of potential weaknesses. With reference to FIG. 1, which illustrates a conventional prior art construction, a typical meter bar includes a central section 10 which is adapted to be disposed horizontally to mount a meter. At one end of the central section 10 is an inlet section 12 while at the opposite end of the central section, is an outlet section, generally designated 14. The inlet section includes an internal conduit 16 which curves approximately 90° within the inlet section 12 from a first, internally threaded port 18 to a second, internally threaded port 20. The port 18 is intended to be connected to a supply of the fluid whose flow is to be measured while the port 20 includes a so-called tailpiece 22 which is threaded into the port 20, and which in turn includes a nut 24 and a gasket 26 by which the inlet side of a meter, such as a gas meter, can be mounted to the bar.

The outlet section also includes a 90° conduit 28 terminating in threaded ports 30 and 32. The threaded port 30 is adapted to be connected to the part of the distribution system that distributes the fluid to points of use while the threaded port 32 receives a second tailpiece 22 including a nut 24 and a gasket 26 for mounting the outlet side of the meter (not shown).

Those familiar with gas distribution systems will recognize that not infrequently, supply pipes are vertically oriented and thus require an elbow and a section of pipe or nipple to extend between the elbow and the port 18. As a consequence, several potential points of leakage are present. There are two potential points of leakage at the elbow, one on the upstream end and one on the downstream end. There is a further potential point of leakage where the pipe or nipple interfaces with the port 18.

Furthermore, the use of tailpieces such as the tailpieces 22 which must be threaded into the ports 20 and 32 create additional potential leakage points at those ports as well.

Needless to say, when a combustible material such as natural gas or other manufactured gas is being metered, leakage creates a hazard, particularly if the meter bar with the meter mounted thereon is located indoors or within a structure that minimizes the possibility of dissipation of any small leakage to the ambient.

Furthermore, in some situations, connections to the upstream side of the inlet conduit 16 or the downstream side of the outlet conduit 28 may be made difficult by spacial limitations. Consequently, there is also a need in meter bars for an adaptor or connector for connecting the same into a fluid distribution system in confined spaces and in a reliable way.

The present invention is directed to solving one or more of the above problems.

SUMMARY OF THE INVENTION

It is the principal object of the invention to provide a new and improved meter bar for mounting flow measuring meters. More particularly, it is an object of the invention to provide a meter bar assembly that significantly reduces potential leak points in installations using the same, minimizes the number of loose, unattached parts required for a given assembly, thereby reducing the possibility that one or more parts will become lost or otherwise mishandled during the installation process and which may be installed with relative ease even at locations where there are severe spacial constraints.

An exemplary embodiment of the invention achieves one or more of the above objects in a meter bar that includes an elongated cast metal structure including a generally central bar section, an outlet conduit section integral with the central section at one end thereof and including an integral outlet conduit terminating at its ends in two spaced ports, one of the ports including a tailpiece for connection to the outlet side of a fluid meter, an inlet conduit section integral with the central section at another end thereof opposite the central section one end and including an integral inlet conduit terminating at its ends in two spaced ports, one of the inlet conduit ports being parallel to the one outlet port and spaced therefrom and including a tailpiece for connection to the inlet side of a fluid meter.

In a preferred embodiment, the other of the inlet ports is located at an end of an elongated, curved section of the inlet conduit to open in the same direction as the one inlet port.

In a preferred embodiment, the tailpieces are integral with the inlet, outlet and central sections forming part of a single casting.

In a preferred embodiment, the central section is generally horizontal and the inlet and outlet port tailpieces and the other inlet port open downwardly.

In one embodiment of the invention, the curved section of the inlet port has an arc length, about 90°, or about 180° from the inlet port tailpiece.

Others of the above objects are accomplished by a meter bar that includes an elongated structure having a generally central bar section, an outlet section at one end of the central section and including an internal conduit having first and second ports at ends thereof, and an inlet section at an opposite end of the central section and having an internal conduit terminating in first and second ports at the ends thereof. The second ports are aligned and are adapted to be connected to a meter for measuring the flow of fluid through the conduits. An adaptor is mounted about at least one of the first ports, the one first port being surrounded by two, axially spaced, radially outward opening grooves with an O-ring seal in one of the grooves and a retaining ring partially received in the other groove and extending radially outward thereof. The adaptor includes an internal bore telescopically receiving the one first port and a radially inward opening groove partially receiving the retaining ring. At least one of the other groove and the radially inwardly opening groove are axially elongated to allow the adaptor to shift axially relative to the retaining ring and thus telescope on the port.

In a preferred embodiment, both the other groove and the radially inward opening groove are axially elongated.

A highly preferred embodiment contemplates that there be an additional radially outward opening groove on the port which is axially spaced from the other groove on a side thereof remote from the one groove and which is sized to wholly contain the retaining ring. A cam surface is located on an end of the adaptor about an end of the bore for camming the retaining ring into the additional groove when the adaptor is first located about the first port and a retaining ring retaining shoulder is located adjacent the cam surface to define a side wall of the radially inward opening groove for capturing the retaining ring therein.

Other objects and advantages will become apparent from the following specification taken in connection with the accompanying drawings.

DESCRIPTION OF THE DRAWINGS

FIG. 2 is a sectional view of one embodiment of a meter bar made according to the invention;

FIG. 3 is a fragmentary, sectional view of a modified embodiment of a meter bar made according to the invention;

FIG. 4 is a fragmentary, sectional view of still another embodiment of a meter bar made according to the invention;

FIG. 5 is a fragmentary, sectional view of part of a tailpiece connection made according to the invention as an alternative embodiment thereof;

FIG. 6 is a fragmentary, sectional view of a swivel adaptor mounted on the meter bar; and FIG. 7 is a fragmentary, sectional view of a telescoping swivel adaptor mounted on the meter bar.

DESCRIPTION OF THE PREFERRED EMBODIMENTS

Figure 1:
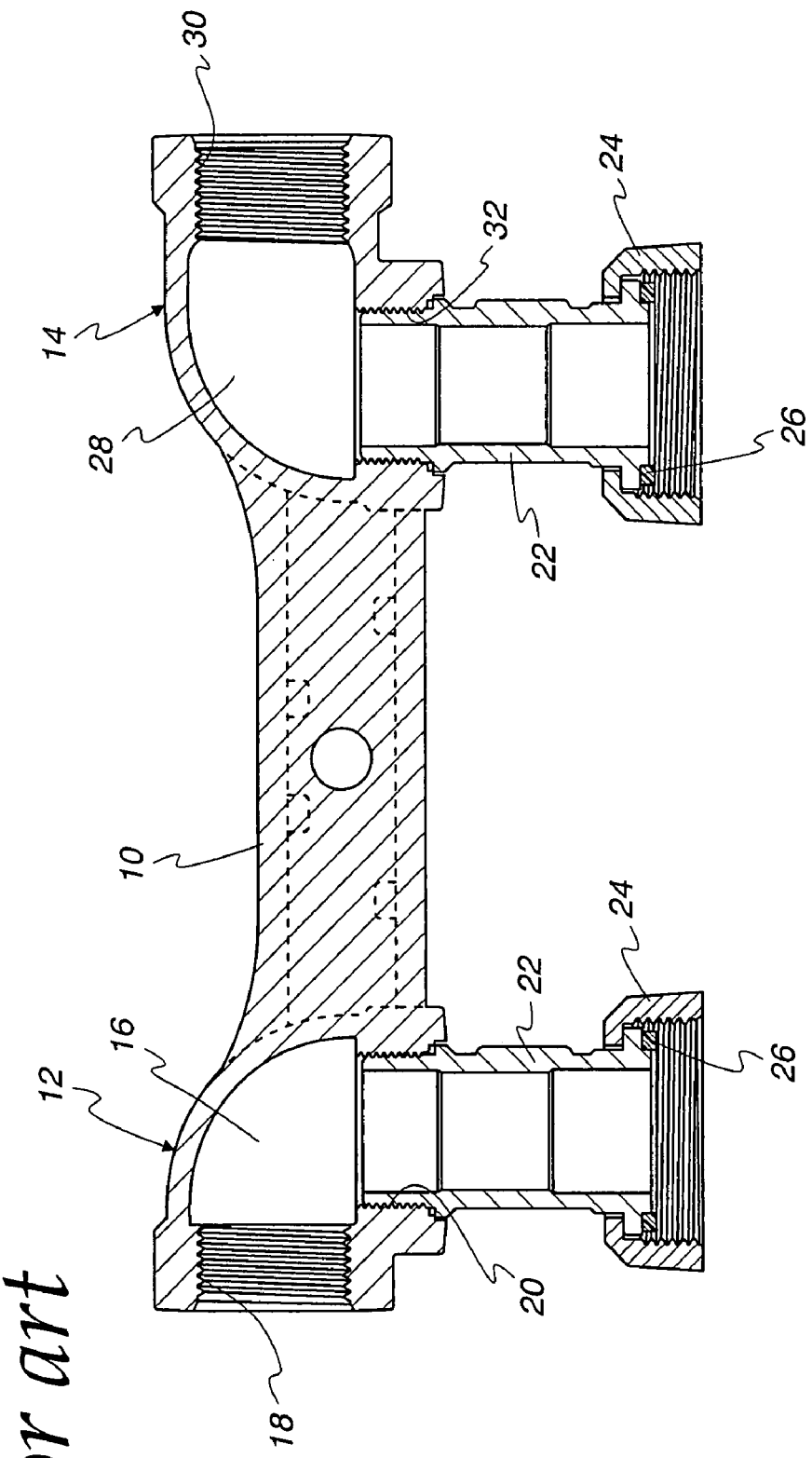
FIG. 1 is a sectional view of a meter bar made according to the prior art.

While the invention herein disclosed is primarily intended for use in natural gas distribution systems, it may be used in other fluid distribution systems wherein flow of the fluid being distributed is to be monitored by a meter, and no limitation to gas systems is intended except insofar as stated in the appended claims.

Turning first to FIG. 2, a first embodiment of a meter bar made according to the invention will be described. As in the prior art, the same includes a central bar section, generally designated 10, which typically will have a cross section much like an I-beam. At one end, specifically the right end as shown in FIG. 2, an outlet section, generally designated 14, is located while at the left hand and as shown in FIG. 2, the central section 10 terminates at an inlet section 12. The inlet section 12 includes an inlet conduit 16 which, at one end 40, includes an integral tailpiece 42. At its other end, the inlet conduit 16 includes an elongated, curved section 44 which terminates in a downwardly opening, male threaded port 46. The presence of the curved section 44, which has an arcuate extent of approximately 90°, allows the meter bar assembly to be connected into a vertical supply line with the central section 10 horizontal while eliminating any need for an elbow and pipe or nipple as in the prior art. The total arcuate extent of the conduit 16 from the integral tailpiece 42 to the port 46 is approximately 180°.

In the embodiment shown in FIG. 2, the outlet section 14 includes an internal conduit 28 which terminates in a horizontally directed, male port 48 for connection to the distribution system to which the fluid whose flow is being monitored is directed. Oppositely, the outlet conduit 28 terminates in an integral tailpiece 42 which is identical to that previously described in connection with the inlet conduit 16.

The components thus far described are integral in a sense that they constitute one piece, as opposed to a plurality of separate pieces joined together by bonding mechanical connections, etc. A preferred embodiment of the invention contemplates that the components thus far described be formed of a one piece metal casting.

As the two tailpieces 42 on both the inlet and outlet sides of the meter bar are identical, only that on the inlet conduit 16 will be described in detail.

The port 40 includes an axially directed shoulder 50 surrounded by a flat 52 which receives a flat gasket seal 54 which may be of conventional construction. Just above the gasket seal 54, the integral tailpiece includes a radially outwardly opening groove 56 which extends about the entire tailpiece. A resilient retaining ring 58 may be slipped over the end of the tailpiece 42 to partially reside within the groove 56. It will be readily appreciated from FIG. 2 that even when the ring 58 is seated against the bottom of the groove 56, it protrudes radially from the groove 56 a certain distance.

A nut 60 includes an internal thread 62 for connection to the appropriate port on the fluid meter. Opposite of the internal thread 62, the same includes a radially inwardly directed, peripheral shoulder 64 whose inner diameter is less than the outer diameter of the retaining ring 58 when the same is nested in the groove 56. Thus, when the nut 60 is turned, it is retained on the integral tailpiece 42 by the retaining ring 58 and will tighten the seal 54 against both of the flat face 52 of the tailpiece 42 and a mating sealing surface on the meter.

It will be observed that the distance between the central section 10 of the meter bar and the groove 56 is such that the nut 60 can be moved to the position shown at the outlet conduit 14 in FIG. 2 to allow installation of the retaining ring 58.

The described structure has a number of advantages over the prior art. As alluded to previously, potential leak points on the upstream side of the inlet conduit 16 are greatly reduced. Furthermore, leak points where the tailpieces 42 are joined to the respective inlet and outlet ends 12 and 14 are eliminated entirely through the use of integral tailpieces 42 made according to the invention. Additionally, the unique use of the retaining ring construction assures positive retention of the nut 60 whether loose or tight on its associated tailpiece 42, eliminating the need to handle unattached loose parts as well as the possibility of mishandling or losing the same.

The invention may be employed in styles of meter bars other than that shown in FIG. 2. For example, in FIG. 3, the meter bar may be identical to that illustrated in FIG. 2 except that, in lieu of the horizontally directed male thread outlet port 48, a vertically directed, male threaded outlet port 70 may be employed. All other components may be the same.

Still another possibility is shown in FIG. 4. In this case, the elongated curved section 44 is done away with and the inlet conduit 16, and its upstream side, terminates in an externally threaded male connector 72 that is horizontally directed. This form of the invention retains the advantage of eliminating leak points in the prior art where separate tailpieces must be threaded into ports for the inlet and outlet conduits 16 and 28.

FIG. 5 shows an alternative structure for connection to the meter. In this case, the tailpiece 42 terminates in a flat face 74 having an axially opening, peripheral groove 76. An O-ring 78 is located in the groove 76 in lieu of the flat seal 54 used in the previously described embodiments.

Turning now to FIG. 6, a swivel adaptor that may be used to connect the meter bar into the system is illustrated. The swivel adaptor allows the meter bar to be assembled or disassembled to rigid piping where spacial constraints do not allow the bar to be swung around to be tightened to mating parts or where traditional union ends are not available. In FIG. 6, one form of swivel adaptor is generally designated 80 and includes a male threaded end 82 for connection to rigid piping at one end and an enlarged bore 84 opening to the other end. The bore 84 is received on an unthreaded end 86 of the inlet conduit 16 of the inlet section 12.

That is, the swivel adaptor 80 is located on the port at the upstream end of the inlet conduit 16 in the illustration shown in FIG. 6. Such a port includes a radially outwardly opening groove 88 for receiving an O-ring seal at a location closest to an end 90 of the inlet section 12. A second groove 92 which is also a radially outwardly opening is located above the groove 88 and is sized so as to be capable of wholly receiving and containing a resilient retaining ring 94. The bore 84 also includes a radially inwardly opening groove 96 which is sized to only partially receive a retaining ring 94, that is to say, when the retaining ring 94 enters the groove 96 as far as possible, a part of the retaining ring 94 projects inwardly to be received in the groove 92.

Just above the groove 96 in the swivel adaptor 80, the bore 84 opens in a beveled cam surface 98.

To assemble the swivel adaptor to the meter bar, the resilient retaining ring 94 is located in groove 92 with the O-ring seal already in place. The swivel adaptor 80 is fitted over the end 90 until the cam surface 98 contacts the retaining ring 94. At this point, the diameter of the retaining 94 will be reduced by the camming force provided by the surface 98 to cam the retaining ring 94 fully into the groove 92 allowing continued axial movement of the swivel adaptor 80 until the groove 96 aligns with the groove 92. At this point, the retaining ring is no longer restrained by the inner diameter of the swivel adaptor 80 and snaps into the groove 96 to hold the swivel adaptor 80 on the end 90. Thus, a connection to a supply line can be made without any need for moving the meter bar in the process, allowing ready, reliable connections to be made in tight areas. Again, the need for handling loose parts that are unassembled from the meter bar is eliminated in this construction.

FIG. 7 illustrates a telescoping swivel adaptor that also telescopes while maintaining a seal. The telescoping swivel adaptor is generally designated 100 and includes an internal bore 102 of approximately the same diameter as the end 90 of the inlet section 12 of the meter bar 10. The end 90 includes a radially outwardly opening groove 104 for receipt of an O-ring 106, a second groove 108, and a third or additional groove 110 which is sized to completely receive a retaining ring 112. The groove 96 in the swivel adaptor corresponding to that shown in the swivel adaptor in FIG. 6 is axially elongated as is the groove 108.

Assembly is as with the embodiment of FIG. 6, making use of a cam surface 98 on a swivel adaptor 100 and a shoulder 112 defining a side of the groove 110 adjacent the cam surface 98. It will be appreciated that not only will the swivel adaptor 100 be rotatable complete an installation in a small area with fixed pipes, but the same is also axially extendable because, due to the elongation of the grooves 96 and 108, the swivel adaptor 100 may be telescoped onto and partially off of the end 90 of the inlet end 12 while maintaining a seal. Thus, a meter bar fitted with swivel adaptors shown in FIGS. 6 and 7 is readily installed in areas where the meter bar cannot be pivoted and where plumbing is fixed and spacial constraints exist. Further, the swivel adaptors of both embodiments shown eliminate unattached loose parts and the attendant problems.

It will therefore be appreciated that a meter bar made according to this invention including all of the facets described herein eliminate the difficulties encountered in the use of unattached loose parts, minimize points of potential leakage and eliminate them altogether in the case of the tailpieces 42. Further, ease of installation in tight places is considerably enhanced.

I claim:

1. A meter bar comprising:
an elongated cast metal structure including a generally central bar section, an outlet conduit section integral with said central section at one end thereof and including an integral outlet conduit terminating at its ends in two spaced ports, one of said ports including a tailpiece for connection to the outlet side of a fluid meter, an inlet conduit section integral with said central section at another end thereof opposite said central section one end and including an integral inlet conduit terminating at its ends in two spaced ports, one of said inlet conduit ports being parallel to said one outlet ports and spaced therefrom and including a tailpiece for connection to the inlet side of a fluid meter and the other of said inlet ports being located at an end of an elongated curved section of said inlet conduit to open in the same direction as said one inlet port;
the meter bar further including a swivel adaptor on the other inlet port, said other inlet port including two axially spaced peripheral, radially outwardly opening grooves, a first of said grooves including an O-ring seal, said swivel adaptor having a threaded end and an opposite retaining end, received on said inlet port and an internal radially opening groove, and an expandable retaining ring received in both said internal groove and the second of said inlet port grooves.

2. The meter bar of claim 1 wherein at least one of said second inlet port and said internal groove is axially elongated to allow telescoping movement of said swivel adaptor on said other inlet port while maintaining a seal therebetween by said O-ring seal.

3. The meter bar of claim 2 wherein both said second inlet port groove and said internal groove are axially elongated.

4. A meter bar comprising:
an elongated cast metal structure including a generally central bar section, an outlet conduit section integral with said central section at one end thereof and including an integral outlet conduit terminating at its ends in two spaced ports, one of said ports including a tailpiece for connection to the outlet side of a fluid meter, an inlet conduit section integral with said central section at another end thereof opposite said central section one end and including an integral inlet conduit terminating at its ends in two spaced ports, one of said inlet conduit ports being parallel to said one outlet ports and spaced therefrom and including a tailpiece for connection to the inlet side of a fluid meter and the other of said inlet ports being located at an end of an elongated curved section of said inlet conduit to open in the same direction as said one inlet port,
wherein said at least one of said tailpieces is fitted with a meter nut and has a face surface surrounding said port with a relief therein, and a seal on said face surrounding said port, a radially outwardly opening peripheral groove on said tailpiece adjacent said face, a retaining ring in said peripheral groove and extending partially out of said groove, said meter nut having an internal threaded opening terminating at one end in a radially inwardly directed shoulder in interference relation with said retaining ring, to thereby retain said meter nut on said tailpiece.

5. A meter bar comprising:

an elongated cast metal structure including a generally central bar section, an outlet conduit section integral with said central section at one end thereof and including an outlet conduit terminating at its ends in two spaced ports, one of said ports including a tailpiece for connection to the outlet side of a fluid meter, an inlet conduit section integral with said central section at another end thereof opposite said central section one end and including an integral inlet conduit terminating at its ends in two spaced ports, one of said inlet conduit ports being parallel to said one outlet ports and spaced therefrom and including an integral tailpiece for connection to the inlet side of a fluid meter, wherein said at least one of said tailpieces is fitted with a meter nut and has a face surface surrounding said port with a relief therein, and a seal on said face surrounding said port, a radially outwardly opening peripheral groove on said tailpiece adjacent said face, a retaining ring in said peripheral groove and extending partially out of said groove, said meter nut having an internal threaded opening terminating at one end in a radially inwardly directed shoulder in interference relation with said retaining ring, to thereby retain said meter nut on said tailpiece.

6. The meter bar of claim 5 wherein both of said tailpieces are fitted with said meter nuts.

7. The meter bar of claim 5 wherein said face includes an axially opening peripheral groove receiving said seal.

8. The meter bar of claim 5 wherein said face includes a peripheral stepped surface receiving said seal.

9. A meter bar comprising:

an elongated cast metal structure including a generally central bar section, an outlet conduit section integral with said central section at one end thereof and including an outlet conduit terminating at its ends in two spaced ports, one of said ports including a tailpiece for connection to the outlet side of a fluid meter, an inlet conduit section integral with said central section at another end thereof opposite said central section one end and including an integral inlet conduit terminating at its ends in two spaced ports, one of said inlet conduit ports being parallel to said one outlet ports and spaced therefrom and including an integral tailpiece for connection to the inlet side of a fluid meter;

the meter bar further including a swivel adaptor on said other inlet port, said other inlet port including two axially spaced peripheral, radially outwardly opening grooves, a first of said grooves including an O-ring seal, said swivel adaptor having a threaded end and an opposite retaining end, received on said inlet port and an internal radially opening groove, and an expandable retaining ring received in both said internal groove and the second of said inlet port grooves.

10. The meter bar of claim 9 wherein at least one of said second inlet port and said internal groove is axially elongated to allow telescoping movement of said swivel adaptor on said other inlet port while maintaining a seal therebetween by said O-ring seal.

11. The meter bar of claim 10 wherein both said second inlet port groove and said internal groove are axially elongated.

12. A meter bar comprising:

an elongated structure having a generally central bar section, an outlet section at one end of said central section and including an internal conduit having first and second ports at ends thereof, an inlet section at an opposite end of said central section and having an integral conduit terminating in first and second ports at the ends thereof;

said second ports being aligned and adapted to be connected to a meter for measuring the flow of fluid through said conduits; and an adapter mounted about at least one of said first ports, said one first port being surrounded by two axially spaced, radially outward opening grooves with an O-ring seal in one of said grooves and a retaining ring partially received in the other of said grooves and extending radially outward thereof, said adaptor including an internal bore telescopingly receiving said one first port and with a radially inward opening groove partially receiving said retaining ring, at least one of said other groove and said radially inward opening groove being axially elongated to allow said adaptor to shift axially relative to said retaining ring and thus telescope on said port.

13. The meter bar of claim 12 wherein both said other groove and said radially inward opening groove are axially elongated.

14. The meter bar of claim 13 including an additional radially outward opening groove axially spaced from said other groove on a side thereof remote from said one groove and sized to wholly contain said retaining ring, and a cam surface on an end of said adaptor about an end of said bore for camming said retaining ring into said additional groove when said adaptor is first placed about said first port, and a retaining ring retaining shoulder adjacent said cam surface and defining a side wall of said radially inward opening groove for capturing said retaining ring therein.

\* \* \* \* \*

UNITED STATES PATENT AND TRADEMARK OFFICE
CERTIFICATE OF CORRECTION

PATENT NO. : 7,584,765 B2
APPLICATION NO. : 10/963204
DATED : September 8, 2009
INVENTOR(S) : Jon Gohde It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this

Fourteenth Day of September, 2010

David J. Kappos
*Director of the United States Patent and Trademark Office*